US012115543B2

(12) United States Patent
Simões et al.

(10) Patent No.: US 12,115,543 B2
(45) Date of Patent: Oct. 15, 2024

(54) LOW NOISE OUTFLOW VALVE EXHAUST NOZZLE FOR AIRCRAFT PRESSURIZATION SYSTEMS

(71) Applicant: EMBRAER S.A., São José dos Campos-SP (BR)

(72) Inventors: Leandro Guilherme Crenite Simões, São José dos Campos-SP (BR); Reginaldo Faisca Fermiano, São José dos Campos-SP (BR); Gilson Atanásio, São José dos Campos-SP (BR); Micael Gianini Valle do Carmo, São José dos Campos-SP (BR)

(73) Assignee: EMBRAER S.A., São José Dos Campos-SP (BR)

( * ) Notice: Subject to any disclaimer, the term of this patent is extended or adjusted under 35 U.S.C. 154(b) by 390 days.

(21) Appl. No.: 17/546,579

(22) Filed: Dec. 9, 2021

(65) Prior Publication Data
US 2023/0182154 A1 Jun. 15, 2023

(51) Int. Cl.
*B05B 1/34* (2006.01)
*G05D 16/20* (2006.01)

(52) U.S. Cl.
CPC ....... *B05B 1/3405* (2013.01); *G05D 16/2013* (2013.01)

(58) Field of Classification Search
CPC ... B05B 1/3405; G05D 16/2013; B64D 13/02
See application file for complete search history.

(56) References Cited

U.S. PATENT DOCUMENTS

| 3,238,955 | A  | * | 3/1966  | Lassiter, Jr. | B64D 13/02 251/118 |
| 2013/0186497 | A1 | * | 7/2013  | Royalty | B64D 13/02 137/899.2 |
| 2013/0232981 | A1 | * | 9/2013  | Pascu | F02K 1/46 60/770 |
| 2016/0229540 | A1 | * | 8/2016  | Loukusa | B60H 1/00564 |
| 2016/0311541 | A1 | * | 10/2016 | Morishita | B64D 13/02 |
| 2023/0287847 | A1 | * | 9/2023  | Liu | F02K 1/40 |

* cited by examiner

*Primary Examiner* — Edelmira Bosques
*Assistant Examiner* — Michael James Giordano
(74) *Attorney, Agent, or Firm* — NIXON & VANDERHYE P.C.

(57) ABSTRACT

Exhaust nozzles for outflow valves (OFVs) that are usefully employed in aircraft pressurization systems include an upstream solid (e.g., cylindrical) wall section and a downstream solid exhaust wall section fixed to the upstream solid wall section. The downstream solid exhaust wall section includes a circumferential portion defining a series of air intake perforations. A pair of vortex generators may also be provided upstream of the series of air intake perforations. The air intake perforations and optional vortex generators thereby allow air from the ambient pressure environment to be introduced into the boundary layer of pressurized air discharged by the OFV in the interior of the perforated region of the downstream solid exhaust wall section of the nozzle thereby reducing adverse pressure gradients therewithin which in turn results in a more attached air flow and hence less perceived noise.

16 Claims, 12 Drawing Sheets

LOW NOISE OUTFLOW VALVE EXHAUST NOZZLE FOR AIRCRAFT PRESSURIZATION SYSTEMS

FIELD

The embodiments disclosed herein relate generally to pressurization systems for aircraft. In particularly preferred forms, the embodiments here are directed toward an outflow valve exhaust nozzles for aircraft pressurization systems that exhibit reduced noise characteristics when pressurized cabin air is exhausted by an outflow valve associated with the pressurization system.

BACKGROUND

The outflow valve (OFV), typically a butterfly valve, is used by the cabin pressurization system of an aircraft to control the cabin pressure as required by the cabin environmental controller. Followed by fuselage leakages, the OFV is the main fuselage opening responsible to exhaust excess pressurized air that is constantly introduced into the aircraft cabin to improve air quality and maintain the desired cabin pressure (i.e., so as to avoid the use of supplemental oxygen masks by passengers and crew). The OFV is therefore responsible for controlling cabin pressure and as such the pressure differential at the OFV equals the difference between the interior cabin pressure and ambient external atmospheric pressure. When embodied as a butterfly valve, the OFV may be modulated as needed by an on-board aircraft environmental controller so as to achieve a desired interior cabin pressurization set point. As can be appreciated the pressure differential at the OFV can be high enough to produce supersonic flow (sometimes reaching up to a Mach number of 2.0) when the aircraft is in cruise flight in the flight level altitudes.

The art solutions to the problem of reducing noise of discharge pressurized air from the OFV has essentially taken two approaches, namely altering the noise source or reducing the acoustic propagation efficiency. More specifically, OFV noise generation is frequently mitigated by employing vortex generators (VGs) to increase flow turbulence of the discharged pressurized air, which can then in turn reduce boundary layer flow separation and dampen the buildup of coherent acoustic sources. VGs can be located at the valve flap or on the valve case (upstream or downstream of the valve flap), with a variety of shapes and quantities. Although usually effective, they alter a complex part such as the OFV which also affects the aircraft cabin pressurization system and its control laws.

A second alternative is to reduce the effectiveness of acoustic propagation downstream of the OFV, such as by using acoustic mufflers or by the addition of a physical damping barrier to sound propagation along the critical sound path. The drawbacks of this alternative solution include not only the large weight and cost impact of the acoustic mufflers, but also the fact that acoustic mufflers added at the OFV exhaust may increase the system pressure loss, affecting the cabin pressurization system and hence cabin comfort.

It would therefore be highly desirable if the OFV could be provided with passive acoustic mitigation so as to reduce cabin noise level when pressurized air is discharged from the cabin to maintain target cabin pressurization and comfort. It is towards fulfilling such need that the embodiments disclosed herein are directed.

BRIEF DESCRIPTION

Broadly, the embodiments disclosed herein are directed toward outflow valve (OFV) exhaust nozzle for an aircraft pressurization system. In accordance with a described embodiment the exhaust nozzle includes an upstream section which includes a cylindrical solid wall, and a downstream section fixed to the upstream section, the downstream section including a frustroconical solid wall having a frustroconical segment which includes a series of air intake perforations.

At least one vortex generator is rigidly attached to the solid exhaust wall and includes a vortex generating section protruding inwardly into the exhaust nozzle. According to some embodiments, a pair of such vortex generators are provided which may diverge outwardly from one another relative to airflow within the nozzle. Each vortex generator may include a base fixed to an exterior surface of the cylindrical solid wall of the upstream section whereby the vortex generating section of each of the vortex generators may extend at substantially a right angle relative to the base thereof. According to certain embodiments, the solid exhaust wall of the upstream section defines a pair of slots such that each of the vortex generating sections of the vortex generators extends through a respective one of the slots. The vortex generating section of each vortex generator may be generally triangular or provided with virtually any wing-shape that achieves the desired vortex generating functions.

The series of air intake perforations may be arranged in a regular or irregular pattern with the individual perforations being substantially circular. The series of air intake perforations may be provided in the frustroconical segment of the frustroconical wall that is between about 10% to about 50% of the total exterior surface area of the frustroconical wall, sometimes between about 20% to about 35% of such total exterior surface area.

The exhaust valve may usefully be employed in an aircraft pressurization system which includes an outflow valve (OFV), typically a butterfly valve, in fluid communication with pressurized air of the aircraft cabin, and an exhaust nozzle as described briefly hereinabove attached to a discharge end of the OFV.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
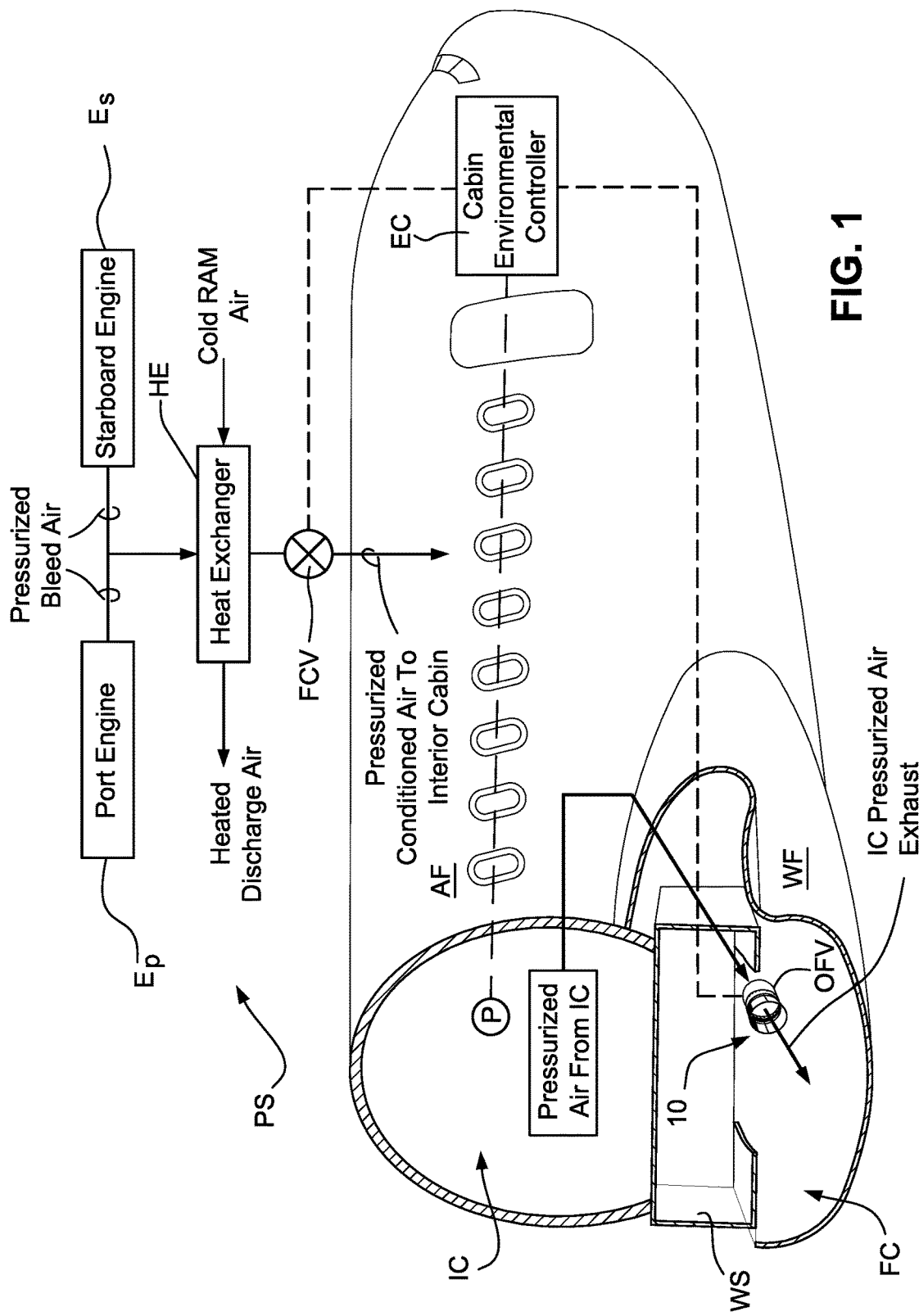
FIG. 1 is a perspective view of a partial aircraft fuselage showing a possible location of the low noise outflow valve exhaust nozzle in accordance with the embodiments disclosed herein as part of the aircraft's pressurization system.

Accompanying FIG. 1 schematically depicts an outflow valve exhaust nozzle 10 associated with an aircraft pressurization system PS employed to pressurize the interior cabin IC of an aircraft fuselage AF. It will be understood in this regard that only a forward portion of the fuselage AF is depicted in FIG. 1 and that the aircraft shown would include a cylindrical fuselage with a suitable aft bulkhead to allow the interior cabin IC to be pressurized by the pressurization system PS.

As schematically depicted, the pressurization system PS draws pressurized bleed air from the compressor section of the turbofans associated with the port and starboard engines Ep and Es, respectively. The pressurized bleed air is temperature adjusted by a heat exchanger HE using cold ram air such that the pressurized conditioned air may be introduced into the interior cabin IC by way of the flow control valve FCV. A pressure sensor P senses pressure of the interior cabin IC and sends pressure signal to the cabin environmental controller EC which in turn operates the flow control valve FCV via a command signal so as to maintain the interior cabin IC within a predetermined pressurization condition that is dependent upon the altitude of the cruise flight. In order to maintain the pressurization condition within the interior cabin at the predetermined pressurization condition, the environmental controller issues a command signal to open/close outflow valve OFV so as to allow pressurized cabin air to be exhausted when needed through the exhaust nozzle 10 and thereby prevent under- and over-pressurization of the interior cabin IC.

Figure 1A:
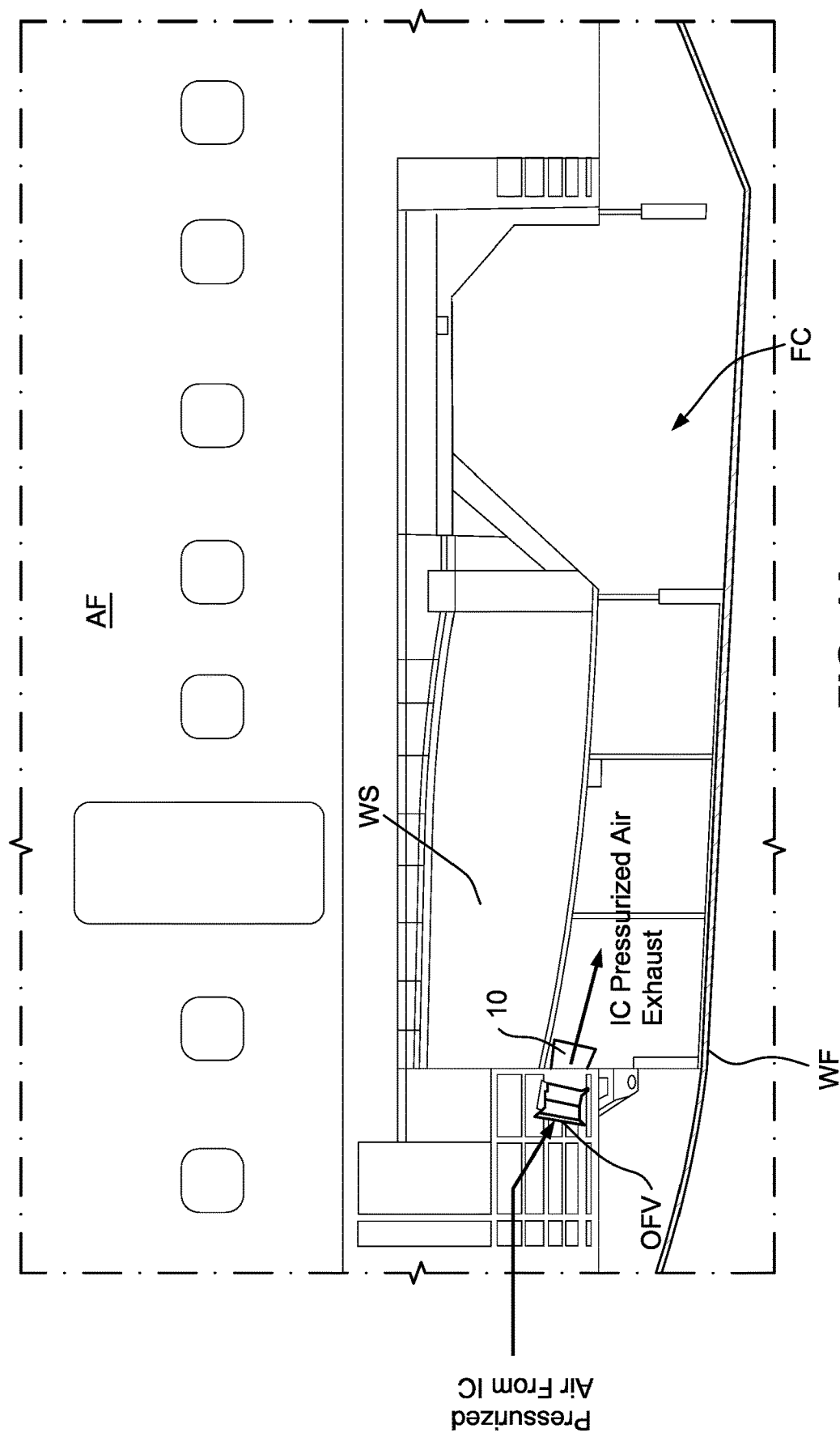
FIG. 1A is a schematic port side elevation view partly in cross-section of a possible location for the outflow butterfly valve and its associated discharge nozzle in accordance with an embodiment of this invention.
Figure 1B:
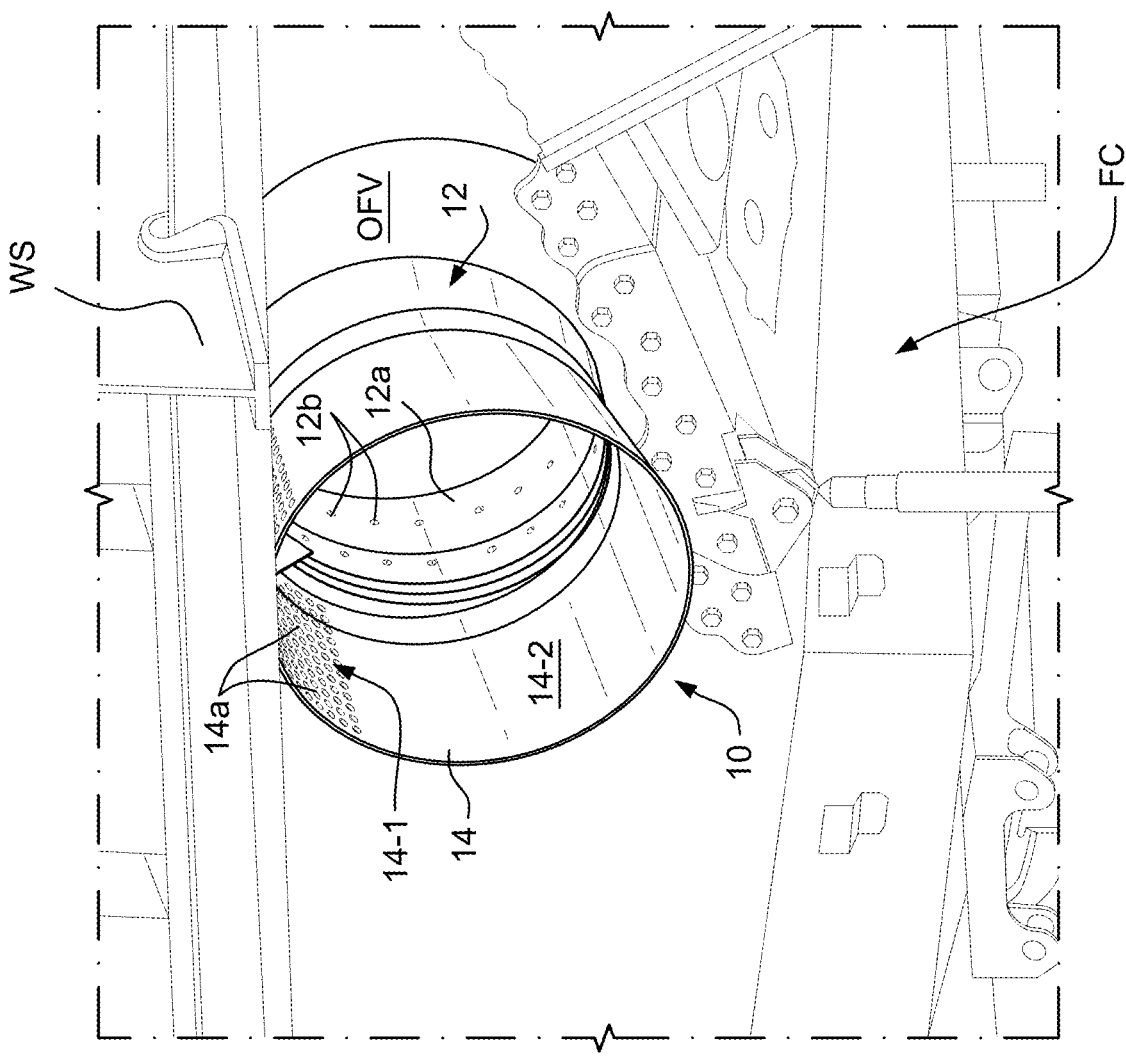
FIG. 1B is an enlarged aft perspective view as seen from the starboard side of the outflow butterfly valve and its associated low noise discharge nozzle in accordance with the embodiment depicted in FIG. 1A.
Figure 2:
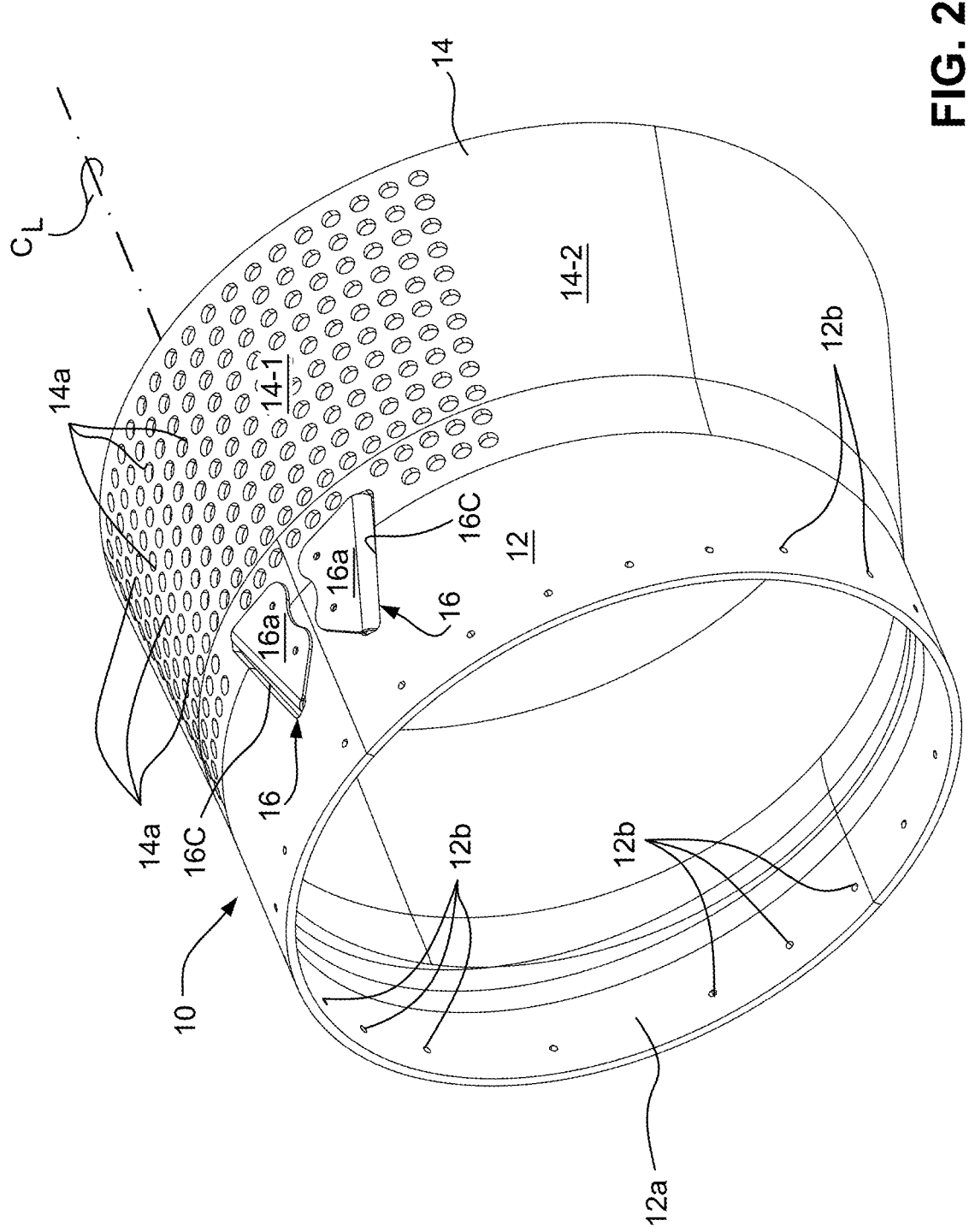
FIG. 2 is a further enlarged perspective view of the low noise butterfly outflow valve exhaust assembly according to an embodiment of this invention as seen from the upstream end thereof.
Figure 3:
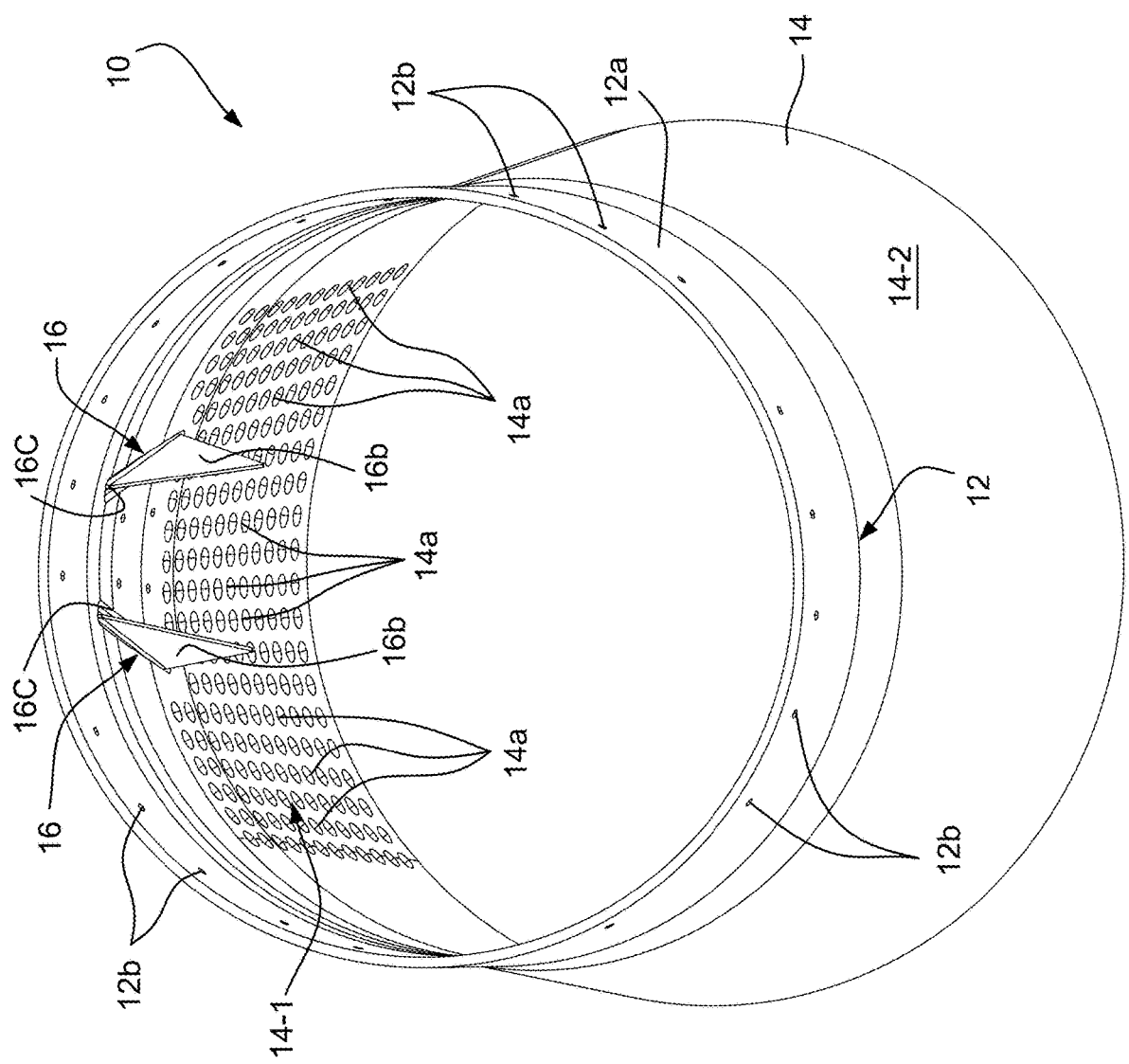
FIGS. 3 and 4 are an enlarged perspective views of the upstream and downstream ends of the low noise butterfly outflow valve exhaust assembly shown in FIG. 2 as viewed from below, respectively.
Figure 4:
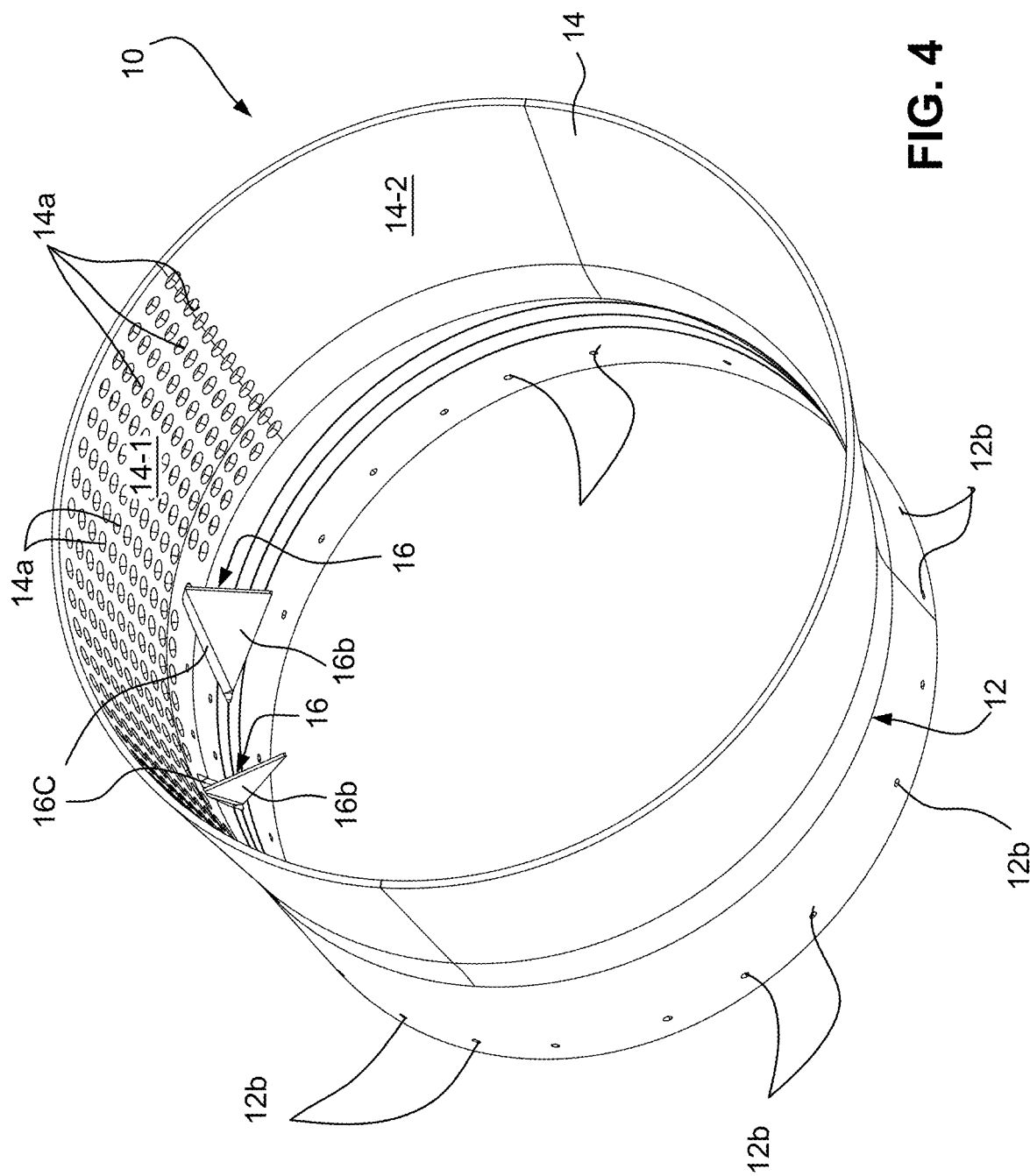
Figure 5:
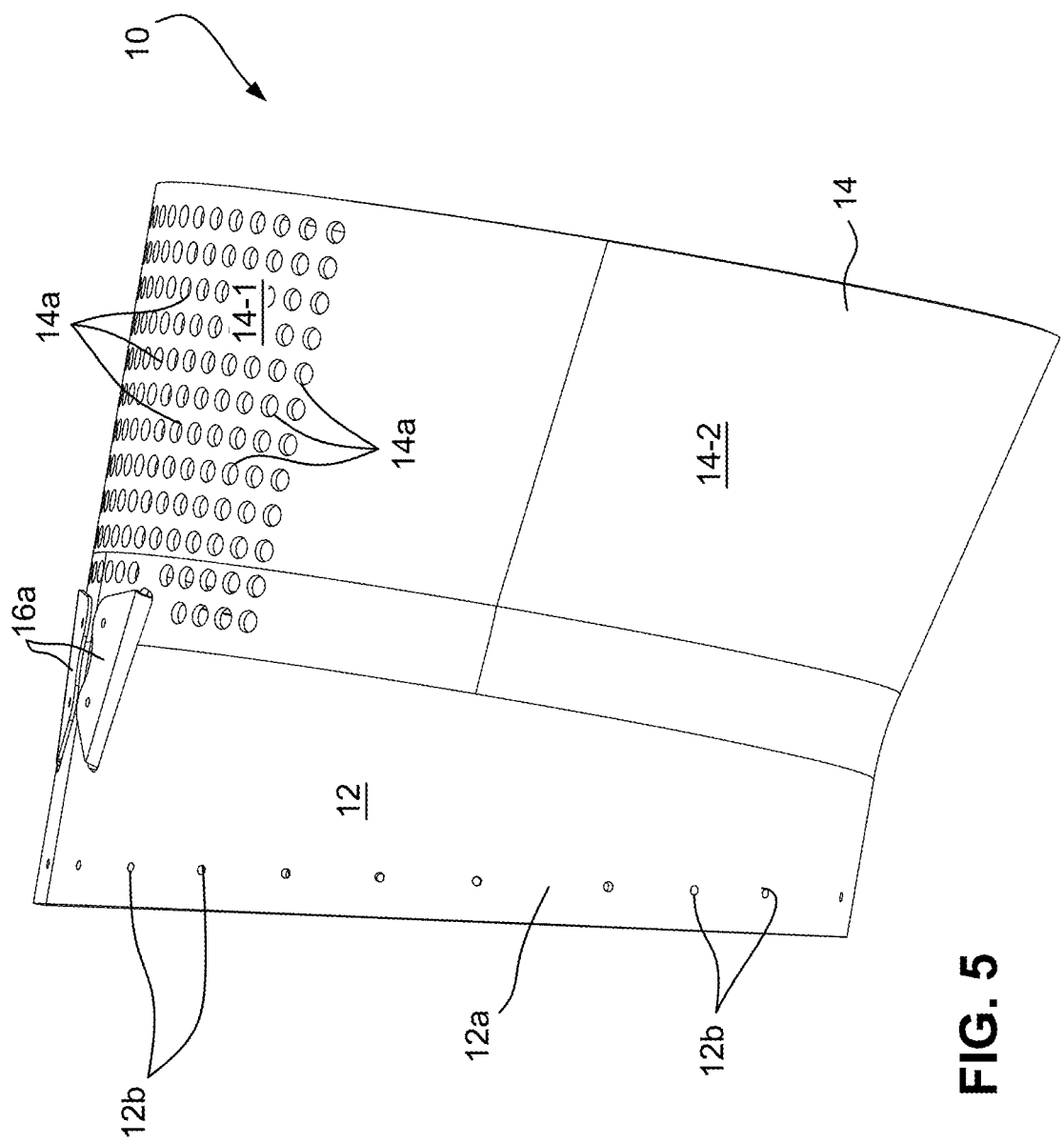
FIGS. 5 and 6 are left and right side elevation views thereof, respectively.
Figure 6:
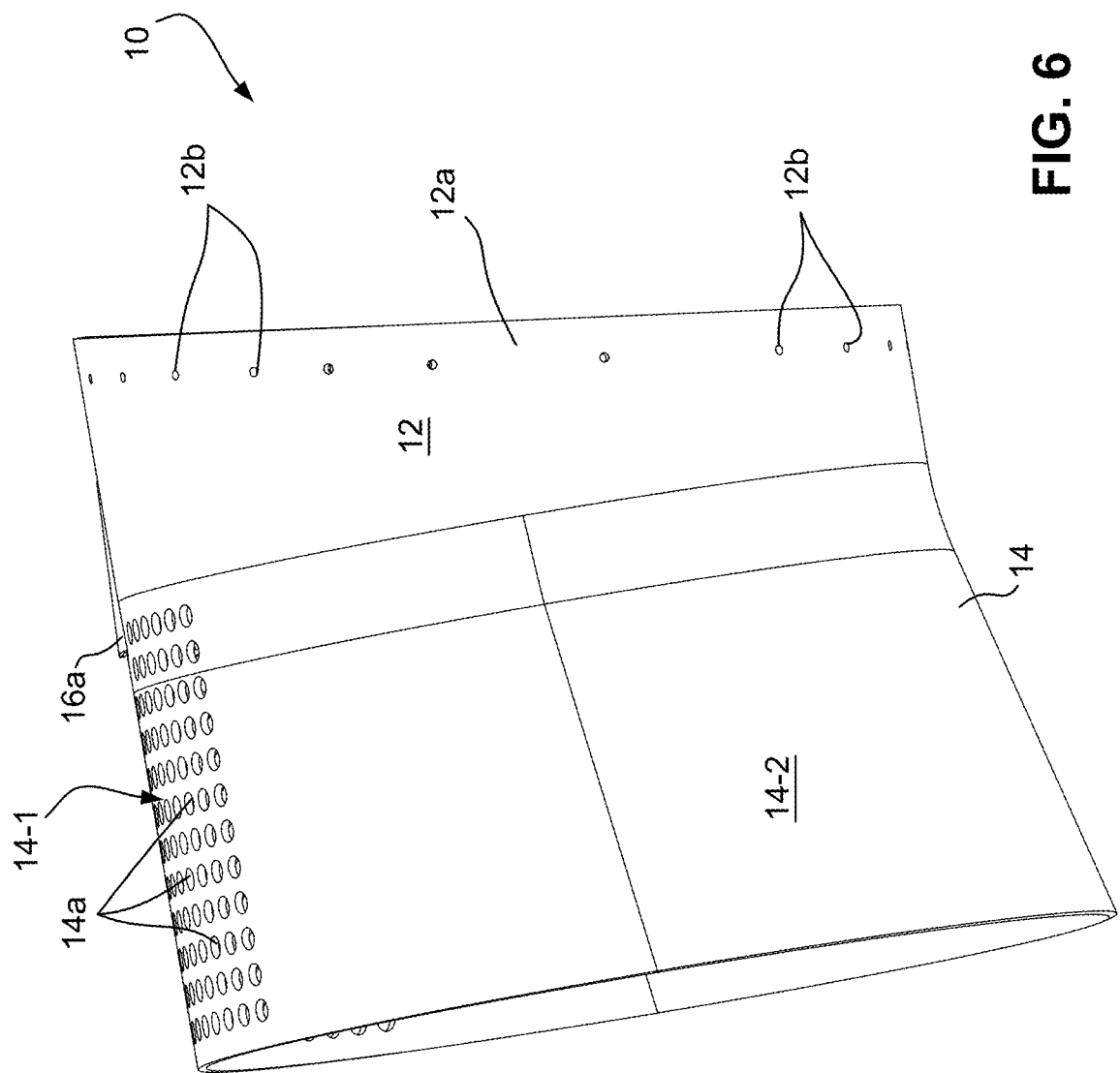
Figure 7:
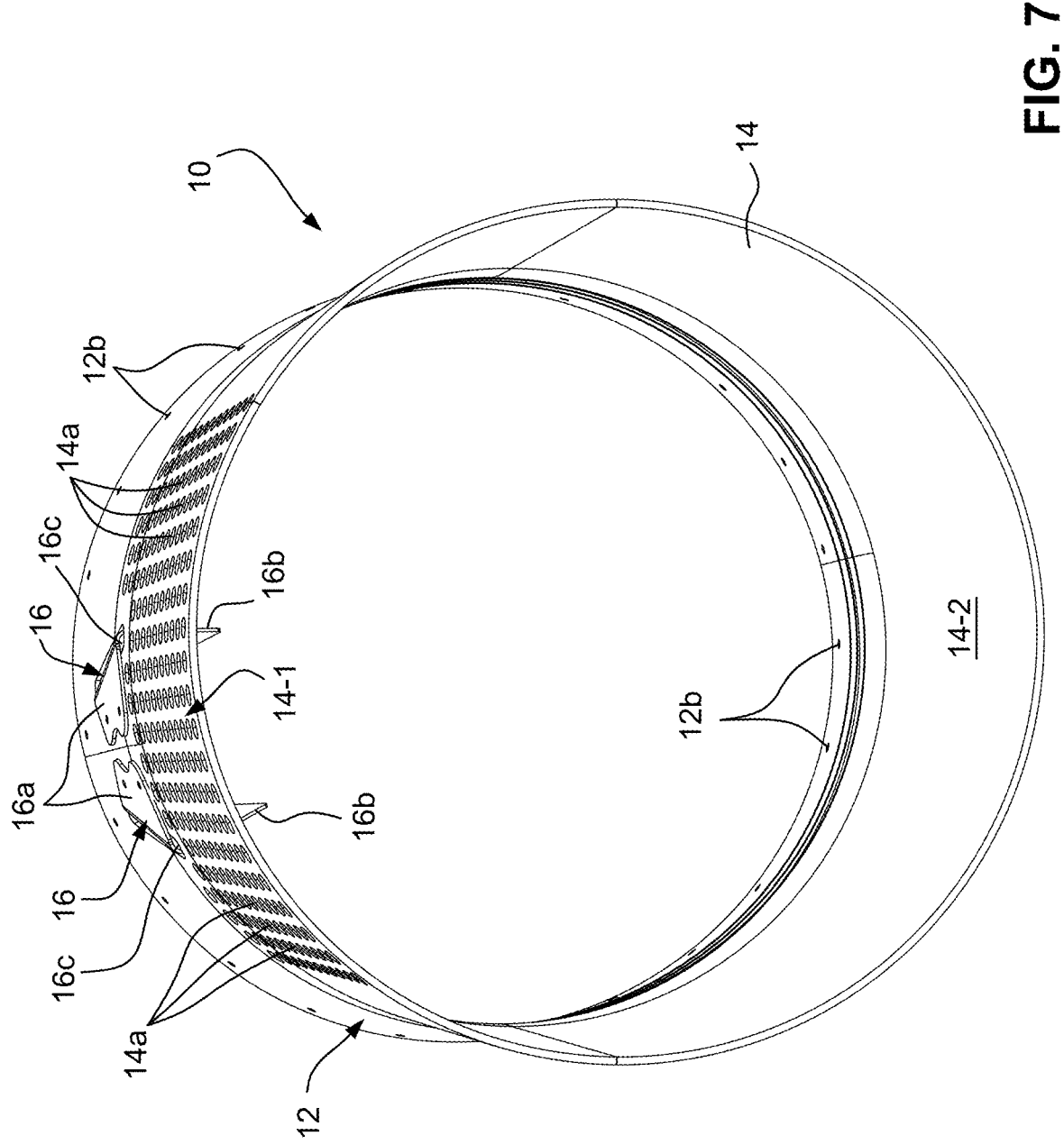
FIGS. 7 and 8 are downstream and upstream end elevation views thereof, respectively.
Figure 8:
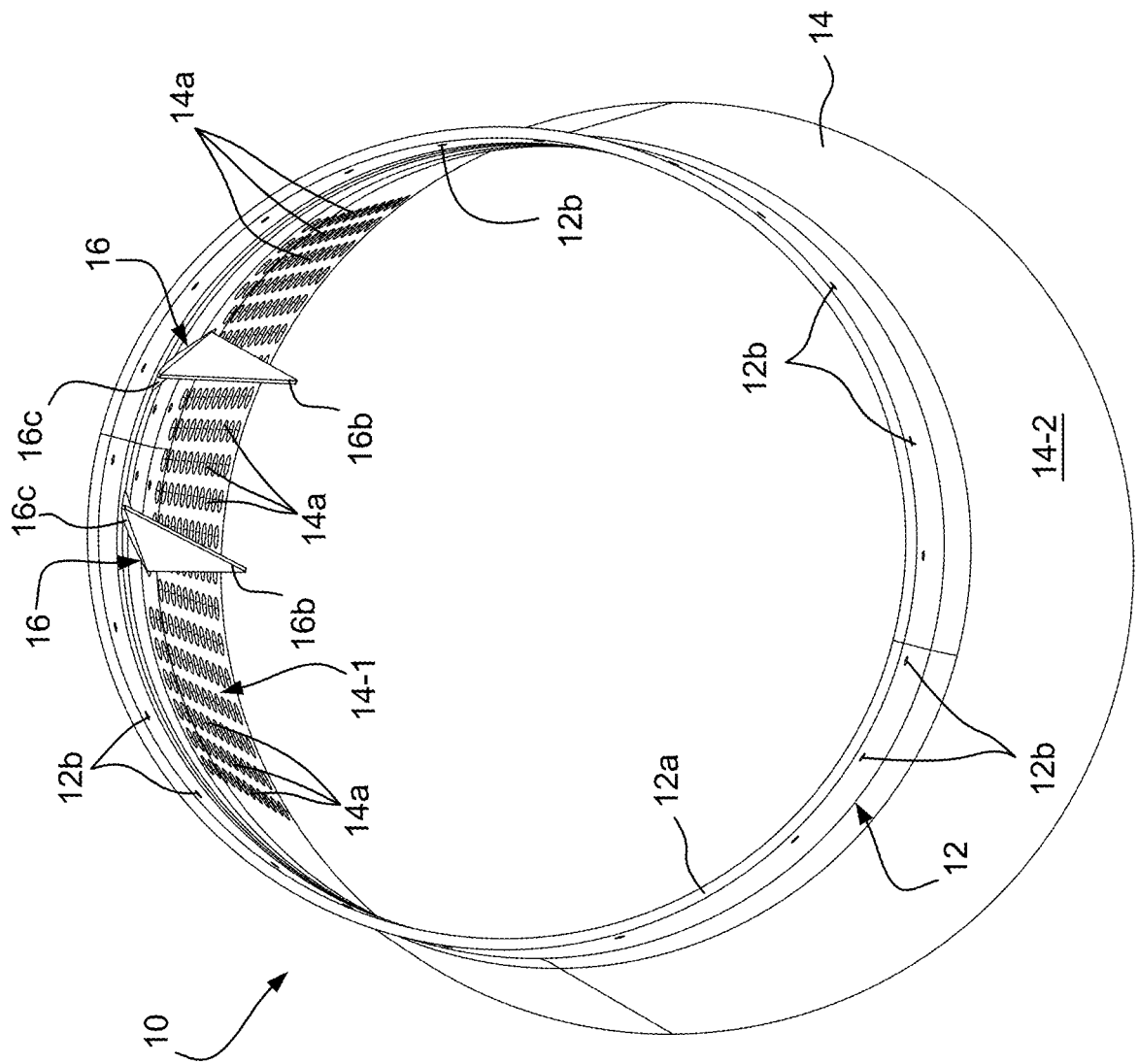
Figure 9:
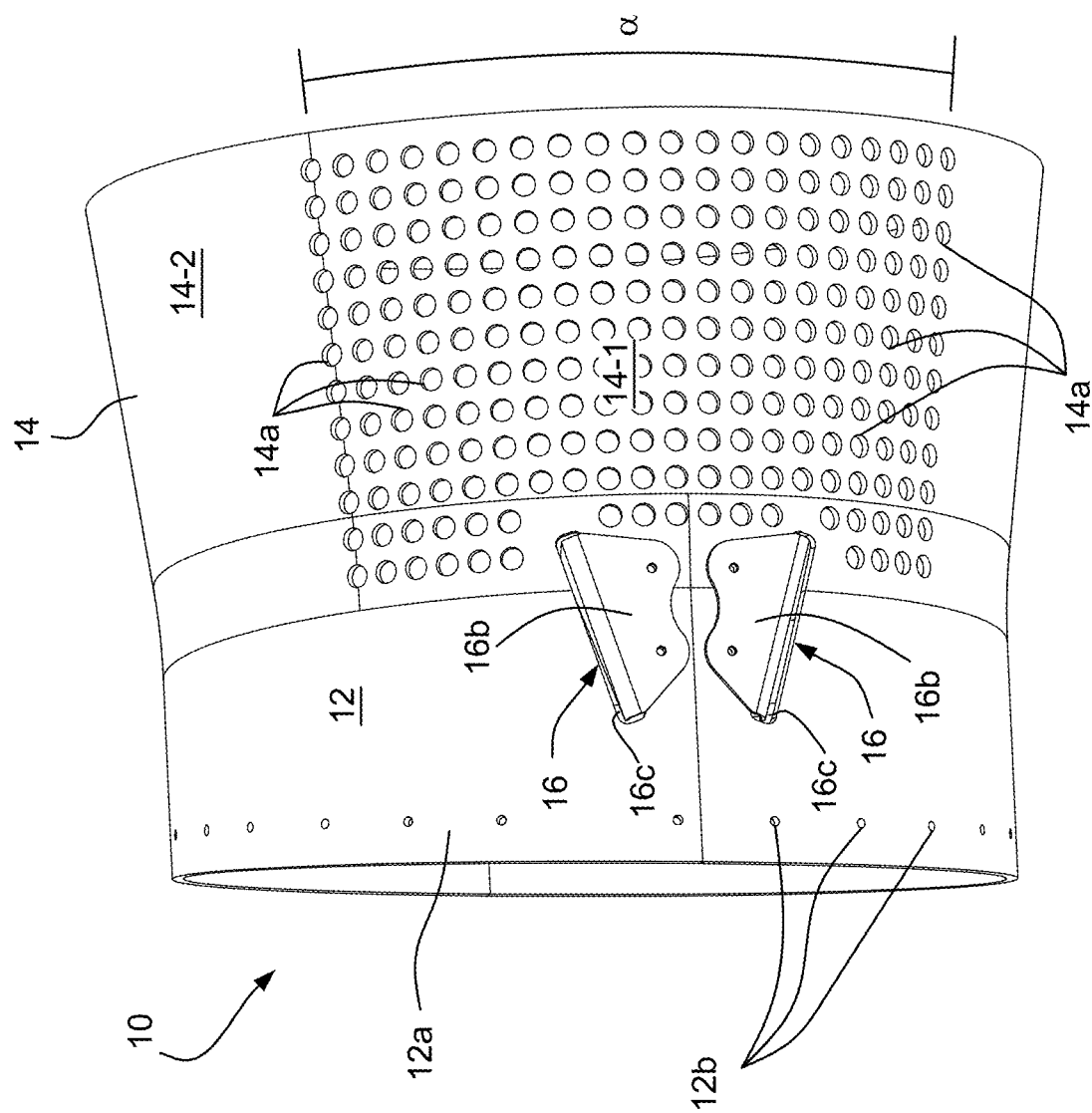
FIGS. 9 and 10 are top and bottom plan views thereof, respectively.
Figure 10:
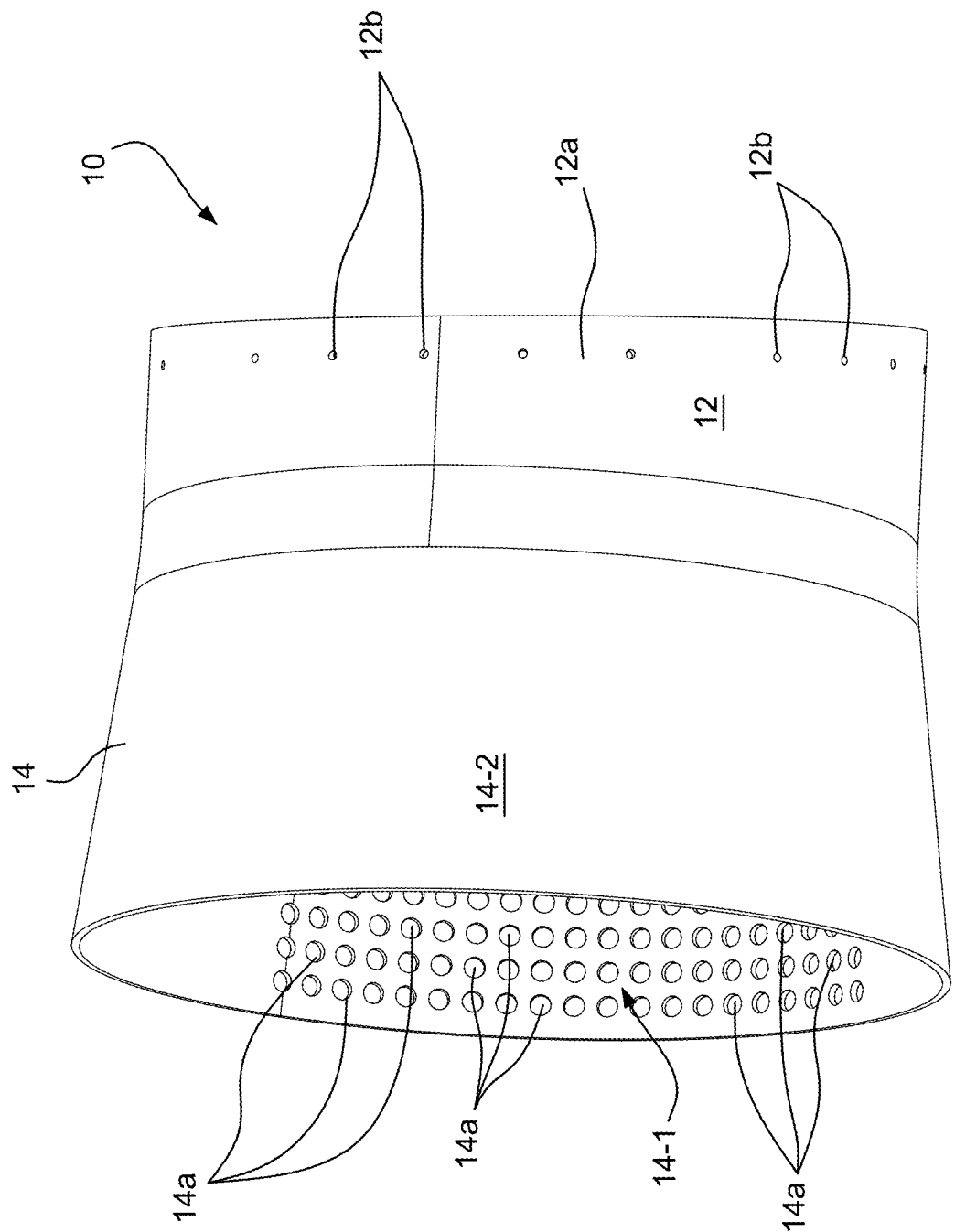

As is seen in FIGS. 1A and 1B, the outflow butterfly valve OFV is typically positioned immediately upstream of the exhaust nozzle 10. The pressurized air that is discharged through the outflow butterfly valve OFV and into the exhaust nozzle 10 may conveniently be exhausted to the ambient external pressure environment at a location that does not affect the aerodynamic performance of the aircraft. In the embodiment shown in FIGS. 1A and 1B, the pressurized air exhausted through the nozzle 10 may conveniently be directed into the wing-fuselage fairing cavity FC of the wing-fuselage fairing WF aft of the wing stub WS.

The exhaust nozzle 10 is perhaps better depicted in accompanying FIGS. 2-10. As shown, the exhaust nozzle 10 is generally comprised of a cylindrical upstream solid wall section 12 and a frustoconical solid exhaust wall section 14 downstream of the section 12. Although in the embodiment depicted, the downstream solid exhaust wall section 14 is frustoconical, it may be provided in any duct shape form that adapts to the cylindrical interface of the OFV internal diameter. The upstream edge portion 12a upstream section 12 is attached to the discharge end of the outflow valve OFV by any suitable mechanical fasteners, e.g., rivets, screws, bolt/nut assemblies and the like positioned within the circumferentially spaced apart connection openings (a representative few of which are identified by reference numeral 12b in the FIGURES).

Important to the noise mitigation characteristics of the nozzle 10, the frustoconical wall defining the downstream section 14 includes a frustoconical wall segment α (see FIG. 9) defining an arcuate perforated conical surface region 14-1 with the remainder of the frustoconical wall being a non-perforated conical surface region 14-2. The perforated conical surface region 14-1 includes an array or series of substantially circular air intake perforations (a representative few of which are identified by reference numeral 14a in the FIGURES) which are provided in the arcuate frustoconical wall segment α defining the perforated conical surface region 14-1. The particular size and geometric arrangement of the perforations 14a are not critical as those in this art could provide the specific number, size and/or arrangement necessary to allow air from the ambient pressure environment (i.e., so-called unpressurized air that has not been pressurized by the aircraft pressurization system) to be introduced into the boundary layer of discharged pressurized air in the interior of the upper region of the frustroconical downstream section 14 of the nozzle 10 thereby reducing adverse pressure gradients therewithin which in turn results in a more attached air flow. The perforations 14a therefore do not need to be provided along the entirety of the frustroconical wall area of the downstream section 14 since only providing the perforations 14a would cause airflow detachment in regions where there already exists a properly attached boundary layer on the solid cone (such as on the lower half of the baseline frustroconical downstream section), resulting in a less efficient system with a higher exhaust pressure loss. The pattern of the perforations 14a does not need to be regular as is depicted in the FIGURES nor do the diameters of the perforations need to be of any particular size provided they are sufficiently large to allow air to flow through the the frustroconical wall segment a of the downstream section 14 while still retaining the required structural integrity of the frustroconical wall. Thus, in preferred forms, the perforations 14a will be formed in the perforated conical surface region 14-1 which spans the conical surface segment α of the frustroconical wall of the downstream section 14 such that the perforations 14a occupy between about 10% to about 50%, typically between about 20% to 35% of the total exterior conical surface area of the frustroconical wall of the downstream section 14.

The embodiment of the discharge nozzle 10 shown in FIGS. 2-10 will also preferably include one or more vortex generators 16 rigidly attached to the nozzle 10 upstream of the perforations 14a. The vortex generators 16 will typically be in the form of a one-piece (unitary) angled metal component having a base section 16a rigidly attached to the nozzle 10 (e.g., to an exterior surface of the cylindrical wall of the upstream section 12) via any suitable fastening element (e.g., rivets, screws, bolt/nut assemblies and the like). A vortex generating section 16b having a generally triangular or trapezoidal shape (or other suitable wing-shape having similar aerodynamic functions) extends at substantially a right angle (i.e., 90°+/− about 5°) through a slot 16c in the cylindrical wall of the upstream section 12 and protrudes into the airflow of the pressurized air being discharged into the nozzle 10 from the outflow valve OFV.

In the depicted embodiment a pair of vortex generators 16 is provided which are fixed to the solid upstream wall section 12 so as to outwardly diverge relative to the airflow within the nozzle 10. Moreover, in the depicted embodiment it is preferred that the vortex generators be positioned substantially symmetrically relative to a centerline CL (see FIG. 2) of the array of perforations 14a. The positioning of the vortex generators 16 will induce vortices of reverse direction to cancel the vortices emanating from the pressurized air discharged from the outflow valve OFV). The nozzle 10 according to the embodiments described herein thus allow the placement of rather large vortex generators downstream of the outflow valve OFV which in turn improves the vortices that are generated thereby. As a result, attachment of the boundary layer of airflow is improved with the advantage that relatively complex component parts, such as the outflow valve OFV and the associated cabin pressurization system, do not need to be modified.

The array of perforations 14a and a pair of divergently angled vortex generators 16 upstream of such perforations in the exhaust nozzle 10 do not increase weight while effectively reducing the in-flight cabin noise levels by up to about 3 dB in the interior cabin regions affected by this noise source. Since they are designed so as to not increase the pressure loss at the outflow valve OFV exhaust, the implementation the embodiments described herein will also not affect the cabin pressurization system nor the passenger comfort during opening and closing of cabin doors.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An outflow valve (OFV) exhaust nozzle for an aircraft pressurization system, wherein the nozzle comprises:
   an upstream section which includes a cylindrical solid wall; and
   a downstream section fixed to the upstream section, the downstream section including a frustroconical solid wall, wherein
   a portion of the frustroconical solid wall includes an arcuate perforated conical surface segment and a remaining portion of the frustroconical solid wall includes an arcuate non-perforated conical surface region, wherein
   the arcuate perforated conical surface segment includes a series of air intake perforations that span the arcuate conical surface segment of the frustroconical wall such that the perforations occupy between about 10% to about 50% of a total exterior surface area of the frustroconical solid wall.

2. The exhaust nozzle according to claim 1, further comprising at least one vortex generator rigidly attached to the cylindrical solid wall and including a vortex generating section protruding inwardly into the exhaust nozzle.

3. The exhaust nozzle according to claim 1, wherein the nozzle comprises a pair of vortex generators, each being rigidly attached to the cylindrical solid wall and including a vortex generating section protruding inwardly into the exhaust nozzle.

4. The exhaust nozzle according to claim 3, wherein the pair of vortex generators diverge outwardly away from one another relative to airflow within the nozzle.

5. The exhaust nozzle according to claim 4, wherein each vortex generator includes a base section fixed to an exterior surface of the cylindrical solid wall of the upstream section.

6. The exhaust nozzle according to claim 5, wherein the vortex generating section of each of the vortex generators extends at substantially a right angle relative to the base section thereof.

7. The exhaust nozzle according to claim 1, further comprising:
   at least one vortex generator having a base section and a vortex generating section extending at substantially a right angle relative to the base section, wherein
   the cylindrical solid wall of the upstream section defines at least one slot, and wherein
   the base section of the at least one vortex generator is fixed to an exterior surface of the cylindrical solid wall of the upstream section adjacent to the at least one slot such that the vortex generating section of the at least one vortex generator extends through the at least one slot and inwardly into the exhaust nozzle.

8. The exhaust nozzle according to claim 3, wherein the vortex generating section of each vortex generator is generally triangular.

9. The exhaust nozzle according to claim 3, wherein the pair of vortex generators is positioned substantially symmetrically relative to a centerline of the series of air intake perforations.

10. The exhaust nozzle according to claim 1, wherein the series of air intake perforations are arranged in a regular pattern.

11. The exhaust nozzle according to claim 10, wherein the air intake perforations are substantially circular.

12. The exhaust nozzle according to claim 1, wherein the series of air intake perforations occupy between about 20% to about 35% of the total exterior surface area of the frustroconical solid wall.

13. An aircraft pressurization system which comprises:
   an outflow valve (OFV) in fluid communication with pressurized air of an aircraft cabin; and
   the exhaust nozzle according to claim 1 attached to a discharge end of the OFV.

14. The aircraft pressurization system according to claim 13, further comprising a pressure sensor for sensing pressurization conditions within the aircraft cabin, and a cabin environmental controller which receives a pressure signal from the pressure sensor and issues a command signal to the OFV so as to modulate the OFV and maintain a predetermined pressurization condition within the aircraft cabin.

15. The aircraft pressurization system according to claim 13, wherein the OFV comprises a butterfly valve.

16. An aircraft which comprises the aircraft pressurization system according to claim 13.

* * * * *